(12) United States Patent
Cattapan

(10) Patent No.: US 12,382,935 B2
(45) Date of Patent: Aug. 12, 2025

(54) SCRAPER APPARATUS

(71) Applicant: Tecno Poultry Equipment S.p.A, Villafranca Padovana (IT)

(72) Inventor: Michele Cattapan, Villafranca Padovana (IT)

(73) Assignee: Tecno Poultry Equipment S.p.A, Villafranca Padovana (IT)

( * ) Notice: Subject to any disclaimer, the term of this patent is extended or adjusted under 35 U.S.C. 154(b) by 0 days.

(21) Appl. No.: 18/566,336

(22) PCT Filed: May 23, 2022

(86) PCT No.: PCT/IB2022/054795
§ 371 (c)(1),
(2) Date: Dec. 1, 2023

(87) PCT Pub. No.: WO2022/259067
PCT Pub. Date: Dec. 15, 2022

(65) Prior Publication Data
US 2025/0081942 A1    Mar. 13, 2025

(30) Foreign Application Priority Data
Jun. 8, 2021    (GB) .................................. 2108164.1

(51) Int. Cl.
*A01K 31/04* (2006.01)
*B65G 45/16* (2006.01)

(52) U.S. Cl.
CPC .............. *A01K 31/04* (2013.01); *B65G 45/16* (2013.01)

(58) Field of Classification Search
CPC ................................ A01K 31/04; B65G 45/16
USPC .......................................................... 198/499
See application file for complete search history.

(56) References Cited

U.S. PATENT DOCUMENTS

| 3,952,863 | A | * | 4/1976 | Schattauer | B65G 45/16 198/499 |
| 3,994,385 | A | * | 11/1976 | Reiter | B65G 45/16 198/499 |
| 3,994,388 | A | | 11/1976 | Reiter | |
| 4,105,109 | A | * | 8/1978 | Schultz | B65G 45/12 198/499 |

(Continued)

FOREIGN PATENT DOCUMENTS

AU    2010201913 B1    9/2010

OTHER PUBLICATIONS

European Patent Office, Search Report for related PCT Application No. PCT/IB2022/054795, dated 08 AGO 2022, 13 pages.

(Continued)

*Primary Examiner* — Mark A Deuble
(74) *Attorney, Agent, or Firm* — RAY QUINNEY & NEBEKER; Daniel J. Bezdjian

(57) ABSTRACT

A poultry droppings belt and cleaner assembly includes a main frame, a belt adapted to extend underneath a number of poultry cages, the belt being wound about a plurality of support rollers mounted to the main frame, and a mounting frame including a scraper blade mounted adjacent the belt for removing droppings from the endless belt. The mounting frame includes first and second rows of protrusions extending across a width of the mounting frame and biasing members on the second row of protrusions. The biasing members are connected to the scraper blade.

10 Claims, 4 Drawing Sheets

(56) References Cited

U.S. PATENT DOCUMENTS

| | | | | |
|---|---|---|---|---|
| 5,799,776 A * | 9/1998 | Dolan | ................. | B65G 45/16 |
| | | | | 198/499 |
| 5,865,997 A * | 2/1999 | Isaacs | ................. | B01D 33/04 |
| | | | | 210/396 |
| 6,948,609 B2 * | 9/2005 | Finger | ................. | B65G 45/16 |
| | | | | 198/497 |
| 8,485,344 B1 * | 7/2013 | Liland | ................. | B65G 45/16 |
| | | | | 198/499 |
| 8,602,205 B2 * | 12/2013 | Yoshizako | ............ | B65G 45/12 |
| | | | | 198/497 |
| 8,881,889 B2 * | 11/2014 | Puchalla | ............... | B65G 45/12 |
| | | | | 198/499 |
| 9,580,251 B2 * | 2/2017 | Krosschell | ............ | B65G 45/16 |

OTHER PUBLICATIONS

Uk Intellectual Property Office, Search Report for related UK Application No. GB2108164.1, dated Mar. 15, 2022, 3 pages.

* cited by examiner

SCRAPER APPARATUS

CROSS REFERENCE TO RELATED APPLICATIONS

This application is a national phase entry under 35 U.S.C. § 371 of International Patent Application PCT/IB2022/054795, filed May 23, 2022, designating the United States of America and published in English as International Patent Publication WO 2022/259067 A1 on Dec. 15, 2022, which claims the benefit of the filing date of U. K. Patent Application 2108164.1 "Scraper Apparatus," filed Jun. 8, 2021, the entire disclosure of which is incorporated herein by reference.

FIELD OF THE INVENTION

The present invention relates to a scraper apparatus and in particular to a scraper apparatus for use in laying cages and aviary systems for poultry.

BACKGROUND

It is known to provide a conveying apparatus including a driven flexible endless belt adapted to traverse the bottom of a series of laying cages and to transport droppings and foreign matter falling from the laying cages to the ends of the apparatus. In order to avoid the droppings and foreign matter become stuck on the return side of the belt it is known to provide a scraper apparatus to clean such an endless belt. However, beyond a certain point the dimensions of the apparatus lead the scraper to have a degree of flexibility such that contact with the endless belt is not guaranteed and that removal of the droppings and foreign matter is no longer assured.

It is an advantage of the present invention that this problem is addressed.

SUMMARY OF THE INVENTION

According to a first aspect of the present invention, a poultry droppings belt and cleaner assembly comprises a main frame, an endless belt adapted to extend underneath a number of poultry cages, the endless belt being wound about a plurality of support rollers mounted to the main frame, at least one of the support rollers being driven, a mounting frame including a scraper blade mounted adjacent the endless belt for removing droppings from the endless belt, wherein a first part of the mounting frame comprises a generally planar support surface and a second part of the mounting frame comprises a first portion connected to the first part of the mounting frame, a second portion spaced parallel to the first part of the mounting frame and an intermediate angular portion connecting the first and second portions, the scraper blade being mounted between the first part of the mounting frame and the second portion of the second part of the mounting frame characterised in that the mounting frame further comprises first and second rows of protrusions extending across a width of the mounting frame, and in that biasing members are provided on the second row of protrusions, and are connected to the scraper blade.

This has as an advantage that the assembly allows pre-loading of the scraper blade across the width of the scraper blade.

Preferably each of the first row of protrusions extend from the first part of the mounting frame and through the second portion of the second part of the mounting frame. More preferably a spacer is located on each of the first row of protrusions between the first part of the mounting frame and the second portion of the second part of the mounting frame.

Preferably each of the second row of protrusions extend from the second portion of the second part of the mounting frame.

Preferably each of the second row of protrusions is located adjacent an associated opening provided in the second portion of the second part of the mounting frame.

Preferably, the biasing members are torsion springs.

More preferably, a first end of each torsion spring is hooked over an edge of the associated opening provided in the second portion of the second part of the mounting frame.

More preferably, a second end of each torsion spring passes though the associated opening and enters an opening provided in the scraper blade.

Preferably the first part of the mounting frame is provided with side flanges adapted for connecting the mounting frame to the main frame.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
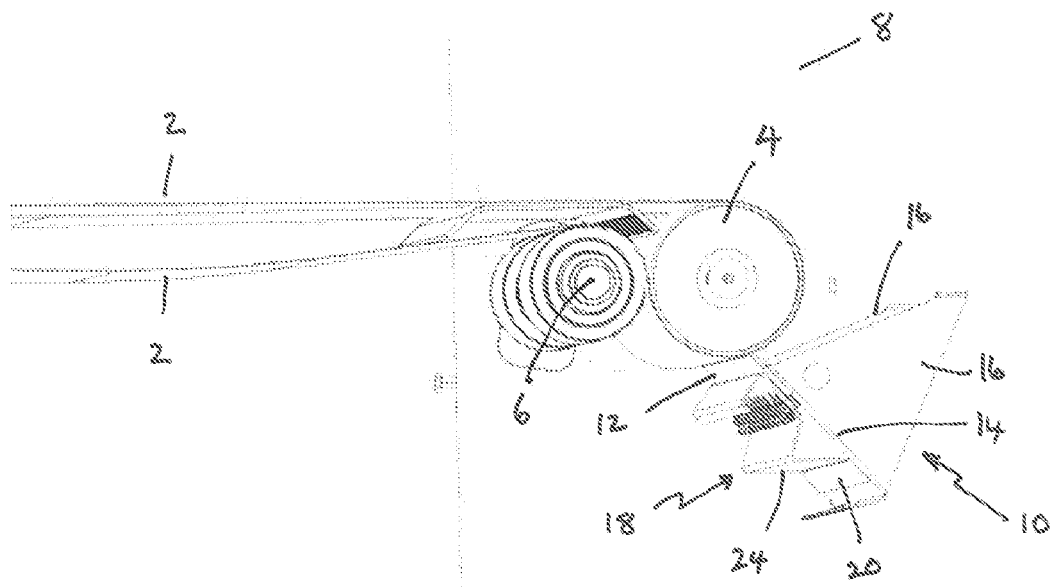
FIG. 1 shows a schematic perspective side view of elements of a poultry droppings belt and cleaner assembly in accordance with the present invention.
Figure 2:
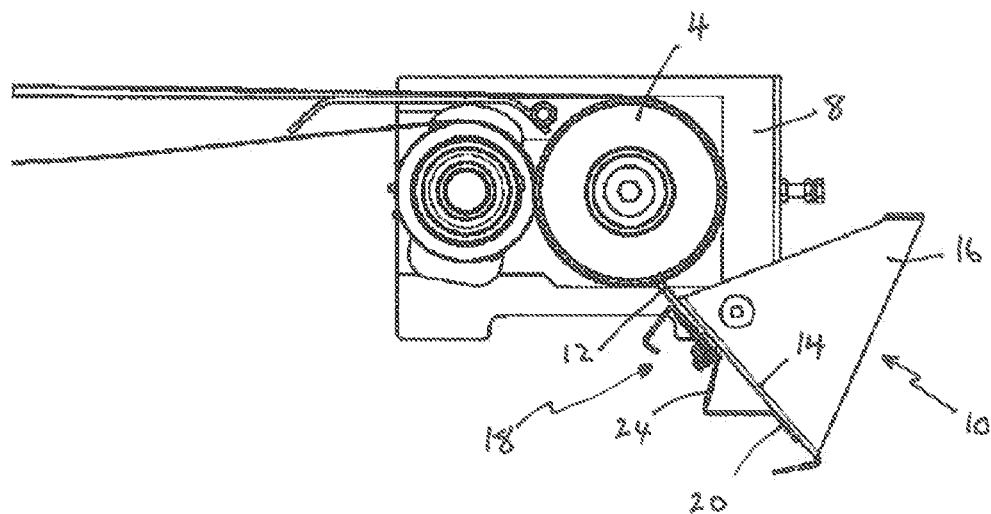
FIG. 2 shows a schematic side view of some of the elements of the poultry droppings belt and cleaner assembly of FIG. 1.

With reference to FIG. 1, a schematic isometric side sectional view of a poultry droppings belt and cleaner assembly is shown. An endless belt 2 is arranged to extend underneath a number of poultry cages (not shown). The endless belt 2 is wound about a plurality of support rollers 4 and a plurality of positioning rollers 6 mounted to a main frame 8. At least one of the support rollers is provided with a drive element (not shown) to enable the endless belt 2 to be driven.

A mounting frame 10 including a scraper blade 12 is mounted adjacent the endless belt 2 for removing droppings from the endless belt 2 as it travels about an end support rollers 4. The mounting frame 10 may be formed from any suitable material, for example steel.

A first part 14 of the mounting frame 10 comprises a generally planar support surface. First and second side flanges 16 are connected to an upper side of the generally planar surface. The side flanges may be used to connect the mounting frame to the main frame in any suitable manner. In use the side flanges 16 and the upper side of the generally planar surface form a chute for directing scraped detritus away from the endless belt 2 for disposal.

A second part 18 of the mounting frame 10 comprises a first portion 20 connected to the first part of the mounting frame 10, a second portion 22 spaced from the first part 14 of the mounting frame 10 and an intermediate angular portion 24 between the first and second portions.

The first and second parts 14, 18 of the mounting frame 10 may be formed from any suitable material, for example from spring steel. The first portion 20 may be connected to the first part 14 of the mounting frame 10 in any suitable manner, for example by welding. The second portion 22 is arranged to be disposed in plane substantially parallel to that of the first part 18 of the mounting frame 10.

In use the scraper blade 12 is mounted between the first part 14 of the mounting frame 10 and the second portion 22 of the second part 18 of the mounting frame 10.

A series of substantially rectangular openings 46 are provided in the second portion 22 of the second part 18 of the mounting frame 10. A lower region of the scraper blade 12 is provided with a plurality of smaller substantially rectangular openings 48. The openings 46, 48 in the scraper blade 12 and the second portion 22 of the second part 18 of the mounting frame 10 are arranged such that when the scraper blade 12 is inserted in the mounting frame 10, the openings 46, 48 are in alignment (most clearly shown in FIGS. 5 and 6).

First and second rows of protrusions 26, 28 are provided on the mounting frame 10. The first row of protrusions 26 are offset both vertically and horizontally from the protrusions of the second row of protrusions 28. The first row of protrusions 26 are arranged above the second row of protrusions 28. The first row of protrusions 26 are arranged between the openings 46 in the second portion 22 of the second part 18 of the mounting frame 10.

Figure 8:
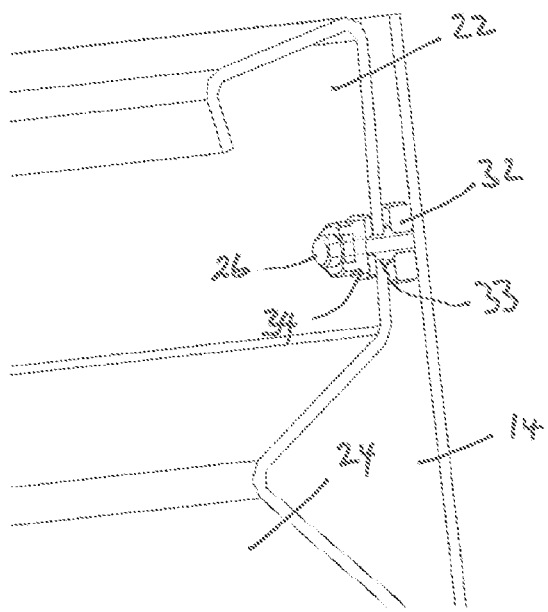
FIG. 8 shows a third part sectional view through the mounting frame.

The first row of protrusions 26 are each provided with a spacer element 32. Each of the first row of protrusions 26 conveniently comprises a threaded shank. Each shank extends from the first part 14 of the mounting frame 10 though a bore in the spacer 32 and through openings 33 provided in the second portion 22 of the second part 18 of the mounting frame 10. A nut 34 is secured on the shank from an open side of the second portion 22 of the second part 18 of the mounting frame 10 (FIG. 8).

Figure 3:
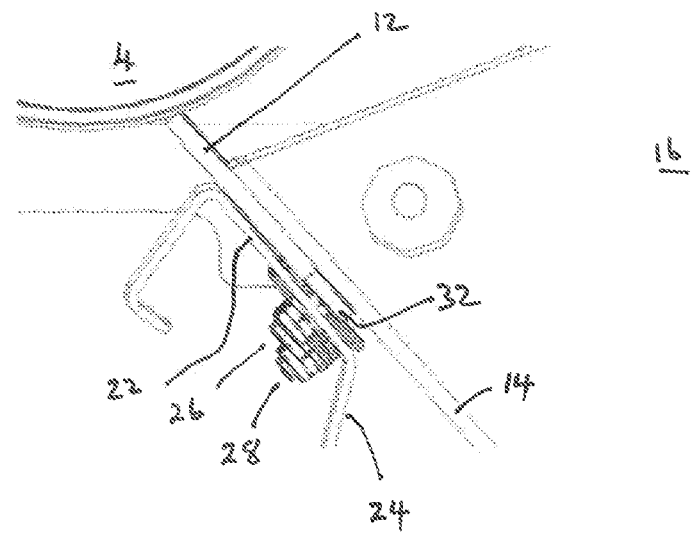
FIG. 3 shows a more detailed a schematic side view of some of the elements of the poultry droppings belt and cleaner assembly of FIG. 2.
Figure 4:
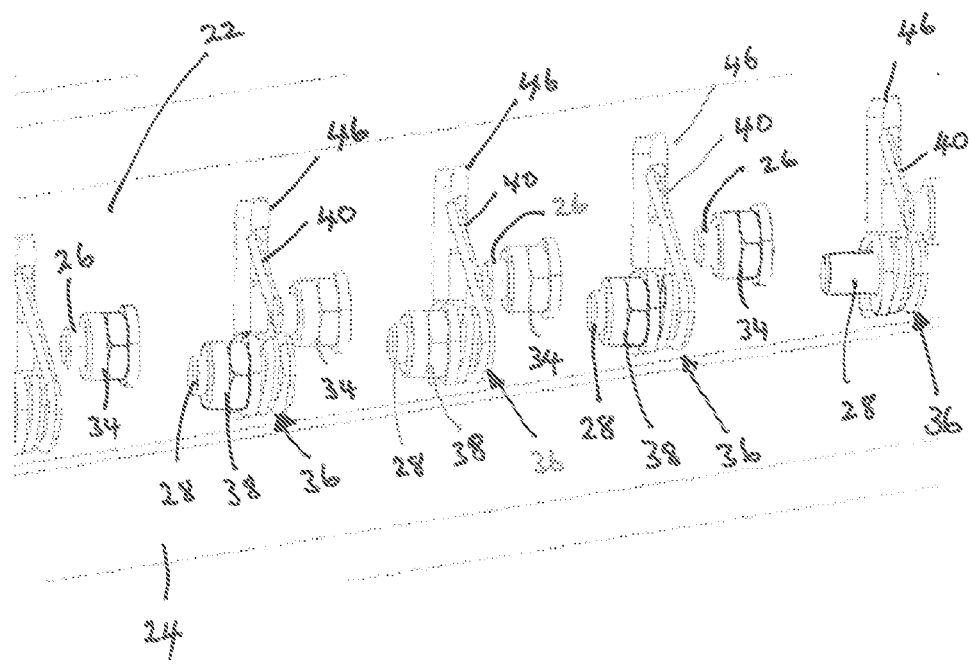
FIG. 4 shows a first perspective view of a side of the mounting frame forming a part of the present invention.

A lower surface of the scraper blade 12 may in use abut an upper contact surface of each of the spacer elements 32 on the first row 26 of protrusions (FIG. 3).

Each of the second row of protrusions 28 are provided with a biasing member 36. Each of the second row of protrusions 28 conveniently comprises a threaded shank extending from the second portion 22 of the second part 18 of the mounting frame 10. The biasing member 36 is located over the protrusion 28 and a nut 38 is secured on the shank to secure the biasing member 36 on the shank of the protrusion 28.

Figure 5:
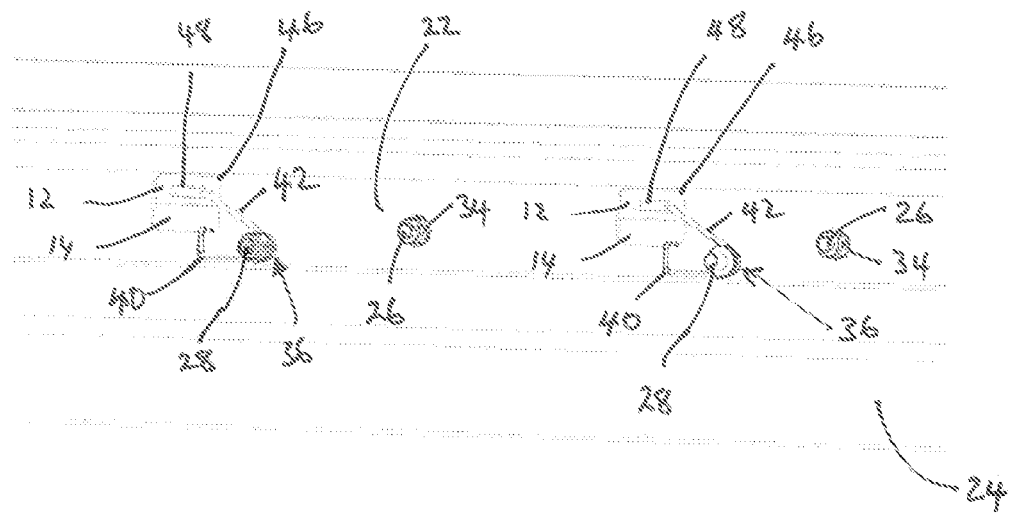
FIG. 5 shows a second perspective view of the elements of FIG. 4.
Figure 6:
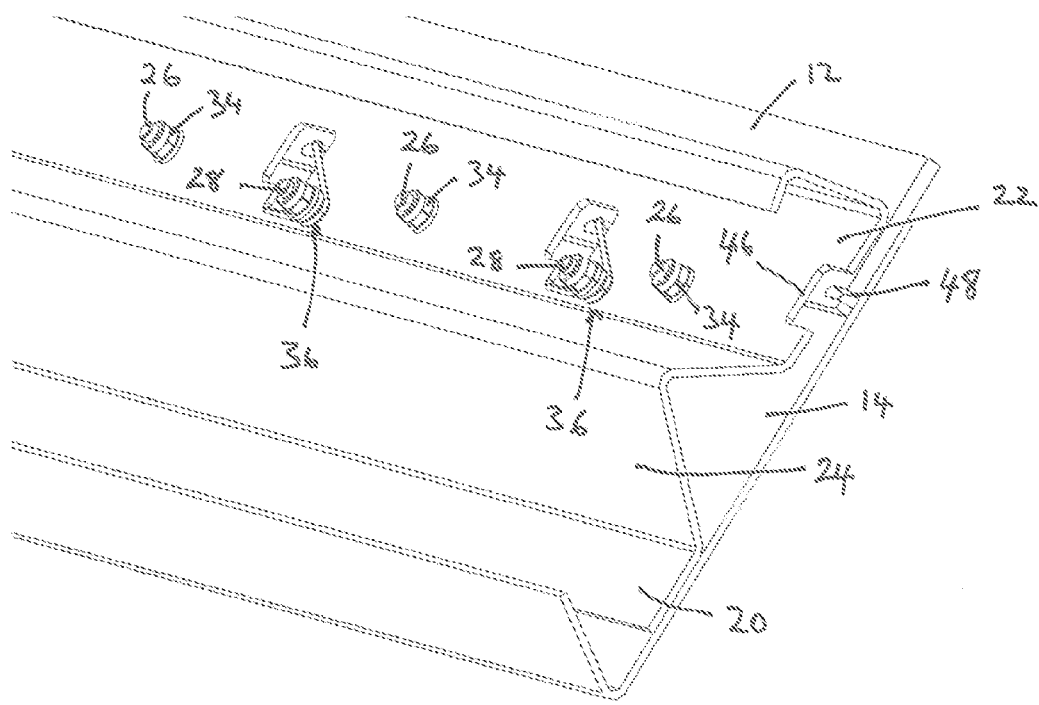
FIG. 6 shows a first part sectional view through the mounting frame.
Figure 7:
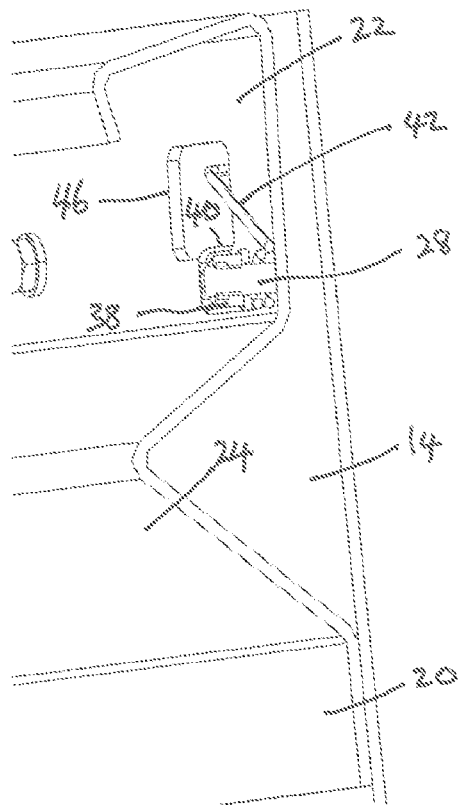
FIG. 7 shows a second part sectional view through the mounting frame.

In the illustrated embodiment, the biasing members 36 take the form of wire torsion springs. A first arm 40 of the biasing member 36 extends along a lower region of the opening 46 provided in the second portion 22 of the second part 18 of the mounting frame 10 before being looped over a lower edge of the opening 46 to secure the first arm 40 of the torsion spring in position. A second arm 42 of the torsion spring extends toward an upper region of the opening 46 before passing through the opening 46 to be seated within the opening 48 in the scraper blade 12 (FIGS. 5 and 6).

This has the effect of creating a row of regions in which the scraper blade 12 is preloaded to act upwards pushing the scraper bale into contact with the endless belt 2 across the width of the scraper blade 12. Nevertheless, the scraper blade 12 is free to move inside the mounting frame 10 towards the spacer elements 32 and in case of deflection of the mounting frame 10 the scraper blade 12 continues to be urged into contact with the endless belt 2.

From reading the present disclosure, other modifications will be apparent to persons skilled in the art. Such modifications may involve other features which are already known in the field of poultry cages and component parts therefore and which may be used instead of or in addition to features already described herein.

The invention claimed is:

1. A poultry droppings belt and cleaner assembly comprising:
   a main frame,
   an endless belt configured to extend underneath a number of poultry cages and being wound about a plurality of support rollers mounted to the main frame, wherein at least one of the support rollers is driven; and
   a mounting frame comprising a scraper blade mounted adjacent the endless belt for removing droppings from the endless belt,
   wherein a first part of the mounting frame comprises a generally planar support surface and a second part of the mounting frame comprises:
      a first portion connected to the first part of the mounting frame;
      a second portion spaced parallel to the first part of the mounting frame; and
      an intermediate angular portion connecting the first and second portions,
   wherein the scraper blade is mounted between the first part of the mounting frame and the second portion of the second part of the mounting frame, and
   wherein the mounting frame further comprises:
      first and second rows of protrusions extending across a width of the mounting frame; and
      biasing members disposed on the second row of protrusions and connected to the scraper blade.

2. The poultry droppings belt and cleaner assembly of claim 1, wherein each protrusion of the first row of protrusions extends from the first part of the mounting frame and through the second portion of the second part of the mounting frame.

3. The poultry droppings belt and cleaner assembly of claim 2, further comprising a spacer located on each protrusion of the first row of protrusions and between the first part of the mounting frame and the second portion of the second part of the mounting frame.

4. The poultry droppings belt and cleaner assembly of claim 1, wherein each protrusion of the second row of protrusions extends from the second portion of the second part of the mounting frame.

5. The poultry droppings belt and cleaner assembly of claim 1, each protrusion of the second row of protrusions is located adjacent an associated opening in the second portion of the second part of the mounting frame.

6. The poultry droppings belt and cleaner assembly of claim 1, wherein the biasing members comprise torsion springs.

7. The poultry droppings belt and cleaner assembly of claim 5, wherein the biasing members comprise torsion springs.

8. The poultry droppings belt and cleaner assembly of claim 7, wherein a first end of each torsion spring is hooked over an edge of the associated opening provided in the second portion of the second part of the mounting frame.

9. The poultry droppings belt and cleaner assembly of claim 7, wherein a second end of each torsion spring passes though the associated opening and enters an opening in the scraper blade.

10. The poultry droppings belt and cleaner assembly of claim 1, wherein the first part of the mounting frame is provided with side flanges configured for connecting the mounting frame to the main frame.

\* \* \* \* \*